United States Patent
Wang et al.

(10) Patent No.: US 10,692,218 B2
(45) Date of Patent: Jun. 23, 2020

(54) METHOD AND SYSTEM OF DETECTING IMAGE TAMPERING, ELECTRONIC DEVICE AND STORAGE MEDIUM

(71) Applicant: PING AN TECHNOLOGY (SHENZHEN) CO., LTD., Shenzhen (CN)

(72) Inventors: Jianzong Wang, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 139 days.

(21) Appl. No.: 16/084,227

(22) PCT Filed: Jun. 30, 2017

(86) PCT No.: PCT/CN2017/091312
§ 371 (c)(1),
(2) Date: Sep. 12, 2018

(87) PCT Pub. No.: WO2018/120724
PCT Pub. Date: Jul. 5, 2018

(65) Prior Publication Data
US 2019/0156486 A1    May 23, 2019

(30) Foreign Application Priority Data

Dec. 30, 2016   (CN) .......................... 2016 1 1265608

(51) Int. Cl.
*G06T 7/11*   (2017.01)
*G06N 3/08*   (2006.01)
(Continued)

(52) U.S. Cl.
CPC .............. *G06T 7/11* (2017.01); *G06N 3/0454* (2013.01); *G06N 3/088* (2013.01); *G06T 1/0028* (2013.01);
(Continued)

(58) Field of Classification Search
CPC ....... G06T 7/0002; G06T 7/11; G06T 1/0028; G06T 2201/0201; G06T 2207/1004;
(Continued)

(56) References Cited

U.S. PATENT DOCUMENTS 6,285,775 B1    9/2001   Wu et al.
2007/0258618 A1  11/2007   Shi et al.
(Continued)

FOREIGN PATENT DOCUMENTS

CN    101655972 A    2/2010
CN    102063627 A    5/2011
(Continued)

OTHER PUBLICATIONS

Computer English Translation of Chinese Patent No. CN 103106656 A, pp. 1-15. (Year: 2013).*
(Continued)

*Primary Examiner* — Daniel G Mariam

(57) ABSTRACT

A method and system of detecting image tampering, an electronic device and a storage medium. The method includes: A. carrying out block segmentation on a to-be-detected image to segment the to-be-detected image into a plurality of image small fragments, and extracting initial tampering detection features from all the image small fragments; B. encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and an image-not-tampered result. The disclosure realizes accurate detection for different types and formats of image tampering.

8 Claims, 6 Drawing Sheets

(51) Int. Cl.
  *G06T 1/00* (2006.01)
  *G06N 3/04* (2006.01)
  *G06T 7/00* (2017.01)

(52) U.S. Cl.
  CPC .......... *G06T 7/0002* (2013.01); *G06N 3/0481* (2013.01); *G06T 2201/0201* (2013.01); *G06T 2207/10004* (2013.01); *G06T 2207/20021* (2013.01)

(58) Field of Classification Search
  CPC ........ G06T 2207/20021; G06N 3/0454; G06N 3/088; G06N 3/0481
  USPC ........................................ 382/159, 173, 224
  See application file for complete search history.

(56) References Cited

U.S. PATENT DOCUMENTS

2008/0193031 A1    8/2008   Shi et al.
  2008/0267520 A1*  10/2008   Chen ..................... G06T 1/0028
                                                            382/250
  2015/0339543 A1   11/2015   Campanelli et al.

FOREIGN PATENT DOCUMENTS

CN    102184537 A    9/2011
  CN    103345758 A   10/2013
  CN    104933721 A    9/2015
  CN    105426912 A    3/2016
  CN    106846303 A    6/2017

OTHER PUBLICATIONS

Zhang, et al. (Image Region Forgery Detection: A Deep Learning Approach), pp. 1-11. (Year: 2016).*

Search Report of European Patent Application No. 17882272.2 dated Jul. 9, 2019.

Ying Zhang et al, Image Region Forgery Defection: A Deep Learning Approach, Proceedings of the Singapore Cyber-Security Conference(SG-CRC), Jan. 15, 2016, p. 1-11.

Ying Zhang et al, Image Region Forgery Detection: A Deep Learning Approach, Proceedings of the Singapore Cyber-Security Conference, Jan. 15, 2016, pp. 1-11.

Takayoshi Yamashita, Deep Learning to Learn in the Illustration, Feb. 22, 2016, pp. 68-77, Kodansha Company, Limited, Japan.

* cited by examiner

METHOD AND SYSTEM OF DETECTING IMAGE TAMPERING, ELECTRONIC DEVICE AND STORAGE MEDIUM

CROSS REFERENCE OF RELATED APPLICATIONS

This application is a national phase entry of the international application PCT/CN2017/091312, filed on Jun. 30, 2017, which is based upon and claims priority to China Patent Application No. CN2016112656082, filed on Dec. 30, 2016 and entitled "Method and Device of Detecting Image Tampering", which is hereby incorporated by reference in its entirety.

TECHNICAL FIELD

This disclosure relates generally to the technical field of computers, and more particularly relates to a method and system of detecting image tampering, an electronic device and a storage medium.

BACKGROUND

At the present, most existing image tampering detection technologies are used to detect single types of tampering, for example, they may only detect these single types of tampering such as copy, move or merge. In addition, as the working principles of most existing tampering detection algorithms are based on a JPEG compression trace, these algorithms may only deal with JPEG type image tampering detection, so that relatively single image formats may be subjected to the image tampering detection. In addition, the existing image tampering detection algorithms need to depend on complicated feature extraction, and extracted features do not have robustness for changes of tampering types, so that the accuracy of detecting the image tampering may not be guaranteed.

SUMMARY

This disclosure mainly aims to provide a method and system of detecting image tampering, an electronic device and a storage medium, and is aimed at accurately detecting different types and formats of image tampering.

On the first aspect, a method of detecting image tampering is provided, the method including:

A. carrying out block segmentation on a to-be-detected image to segment the to-be-detected image into a plurality of image small fragments, and extracting initial tampering detection features from all the image small fragments;

B. encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and an image-not-tampered result.

On the second aspect, a system of detecting image tampering is provided, the system including:

an extraction module, which is used for carrying out block segmentation on a to-be-detected image to segment the to-be-detected image into a plurality of image small fragments, and extracting initial tampering detection features from all the image small fragments;

a detection module, which is used for encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and an image-not-tampered result.

On the third aspect, an electronic device is provided, including processing equipment and storage equipment. The storage equipment stores an image tampering detection program which includes at least one computer readable instruction, and the at least one computer readable instruction may be executed by the processing equipment so as to implement the following operations:

A. carrying out block segmentation on a to-be-detected image to segment the to-be-detected image into a plurality of image small fragments, and extracting initial tampering detection features from all the image small fragments;

B. encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and an image-not-tampered result.

On the fourth aspect, a computer readable storage medium is provided, which stores at least one computer readable instruction executed by processing equipment to implement the following operations:

A. carrying out block segmentation on a to-be-detected image to segment the to-be-detected image into a plurality of image small fragments, and extracting initial tampering detection features from all the image small fragments;

B. encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and an image-not-tampered result.

The method and system of detecting the image tampering, the electronic device and the storage medium, which are provided by the disclosure, carry out the block segmentation on the to-be-detected image to segment the to-be-detected image into the plurality of image small fragments, extract the initial tampering detection features from all the image small fragments, then encode the extracted initial tampering detection features with the predetermined encoder to generate the complicated tampering features, and determine the tampering detection result of the to-be-detected image according to the complicated tampering features. As the tampering of the to-be-detected image is detected on the basis of the initial tampering detection features of all the image small fragments after the to-be-detected image is segmented and the complicated tampering features generated by encoding the initial tampering detection features with the encoder without depending on a JPEG compression trace theory, the image type capable of being subjected to tampering detection is not limited to JPEG; in addition, due to the segmenting and encoding modes for detection, various types of image tampering modes may be accurately detected, thus realizing accurate detection for different types and formats of image tampering.

Objects, functional features, and advantages of this disclosure will be described below in further detail in connection with embodiments and the accompanying drawings.

DETAILED DESCRIPTION OF THE EMBODIMENTS

To make technical problems to be solved, technical solutions and beneficial effects in this disclosure clearer and more understandable, this disclosure will be described below in further detail in connection with accompanying drawings and embodiments. It should be understood that the specific embodiments described herein are merely illustrative of the disclosure, but are not intended to limit the disclosure.

Figure 1:
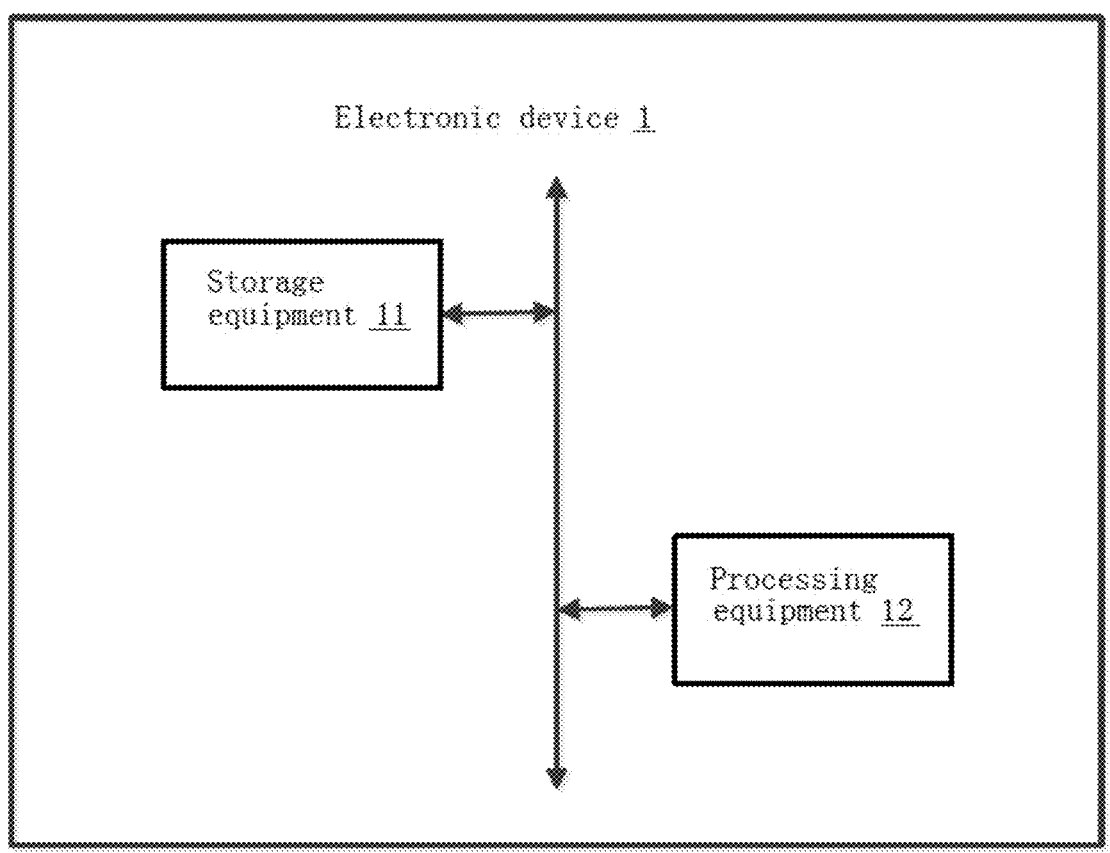
FIG. 1 is an application environment schematic diagram of a preferred embodiment for implementing a method of detecting image tampering of the disclosure.

FIG. 1 is an application environment schematic diagram of a preferred embodiment for implementing a method of detecting image tampering in accordance with the disclosure. An electronic device 1 is equipment capable of automatically calculating a value and/or processing information according to a preset or pre-stored instruction. The electronic device 1 may be a computer, a single network server, a server group consisting of multiple network servers, or a cloud computing-based cloud consisting of a large number of hosts or network servers, wherein as one of distributed computations, cloud computing is a super virtual computer consisting of a group of loosely-coupled computer sets.

In this embodiment, the electronic device 1 includes storage equipment 11 and processing equipment 12 and the like. The processing equipment 12 is used for supporting operation of the electronic device 1, and may include one or multiple micro processors, digital processors and the like. The storage equipment 11 is used for storing various data and computer readable instructions, and may include one or multiple non-volatile memories, such as a Read-Only Memory (ROM), an Electrically Programmable Read-Only Memory (EPROM) or a Flash Memory (FM) and the like. In one embodiment, the storage equipment 11 stores an image tampering detection program which includes at least one computer readable instruction stored in the storage equipment 11. The at least one computer readable instruction may be executed by the processing equipment 12 so as to implement methods of detecting image tampering of all the embodiments of the application.

A method of detecting image tampering is provided.

Figure 2:
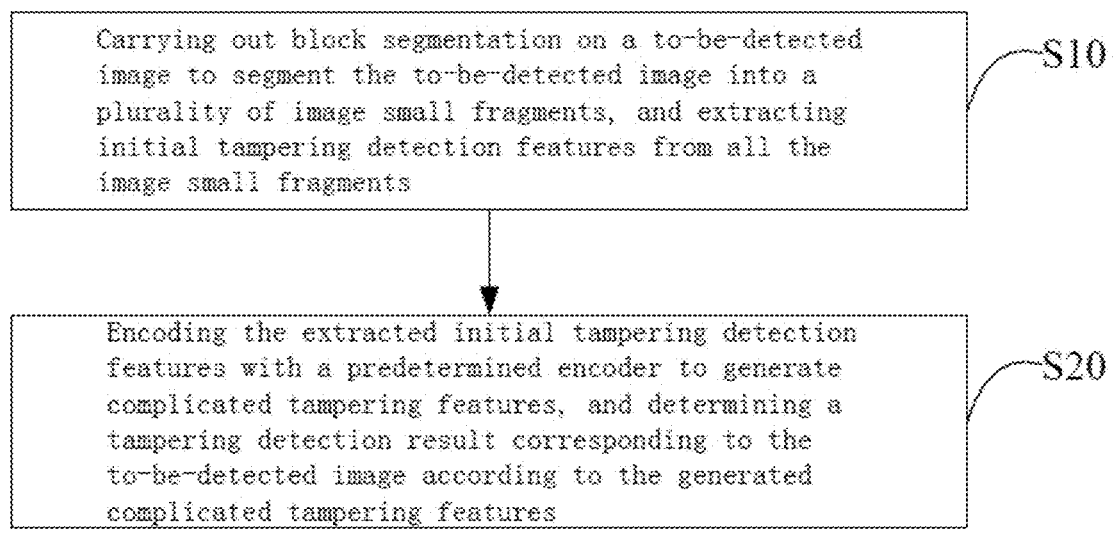
FIG. 2 is a flowchart of one embodiment of a method of detecting image tampering of the disclosure.

With reference to FIG. 2, FIG. 2 is a flowchart of one embodiment of a method of detecting image tampering in accordance with the disclosure.

In one embodiment, the method of detecting image tampering includes:

Step S10, block segmentation is carried out on a to-be-detected image to segment the to-be-detected image into a plurality of image small fragments, and initial tampering detection features are extracted from all the image small fragments.

In this embodiment, the block segmentation is carried out on various types of to-be-detected images, such as JPEG, PNG and GIF, and the to-be-detected image is segmented into N*M (for example, 32*32) image small fragments, wherein N and M are positive integers, and the initial tampering detection features are extracted from all the image small fragments. The initial tampering detection features may include a color feature, a pixel feature and the like, and will not be limited here, wherein when the block segmentation is carried out on the to-be-detected image, the to-be-detected image may be segmented into respective image small fragments with the same sizes, or may be segmented into image small fragments with different sizes according to a certain ratio or randomly, and the segmentation will not be limited here. The image small fragments may be either in regular shapes, such as squares and rectangles, or irregularly shaped fragments, and their shapes will not be limited here.

Step S20, the extracted initial tampering detection features are encoded with a predetermined encoder to generate complicated tampering features, and a tampering detection result corresponding to the to-be-detected image is determined according to the generated complicated tampering features, wherein the tampering detection result includes an image-tampered result and an image-not-tampered result.

After the initial tampering detection features in all the image small fragments are extracted, the extracted initial tampering detection features are encoded with the predetermined encoder to generate the complicated tampering features, and detection is finally carried out according to the generated complicated tampering features to determine whether the to-be-detected image is in a tampered state or a non-tampered state, wherein the predetermined encoder may be a relatively fixed encoder, and also may be an encoder capable of performing deep learning such as learning and training, for example a single auto-encoder and a stacked auto-encoder, and it will not be limited here.

In one implementation mode, the predetermined encoder is capable of performing deep learning such as learning and training, for example the stacked auto-encoder. A training process of the predetermined encoder is as follows:

C. a preset number (for example, 100,000) of image samples are obtained, and the tampering result of each image sample is marked, wherein the tampering result includes the image-tampered result and the image-not-tampered result;

D. block segmentation is carried out on each image sample to segment each image sample into N*M (for example, 32*32) image small fragments, wherein N and M are positive integers, and initial tampering detection features are extracted from all the image small fragments of each image sample to extract the initial tampering detection features corresponding to each image sample;

E. all the image samples are classified into a first data set and a second data set according to a ratio of X to Y (for example, 8 to 2), wherein the number of image samples in the first data set is greater than that of image samples in the second data set, the first data set is used as a training set, and the second data set is used as a test set; and X is greater than 0, and Y is greater than 0;

F. the encoder is trained with the initial tampering detection features corresponding to all the image samples in the first data set, and the accuracy rate of the trained encoder is verified with the initial tampering detection features corresponding to all the image samples in the second data set;

G. if the accuracy rate of the trained encoder is greater than or equal to a preset accuracy rate (for example, 95%), the training is ended, or if the accuracy rate of the trained encoder is less than the preset accuracy rate, the number of image samples is increased, and the steps D, E and F are repeatedly executed till the accuracy rate of the trained encoder is greater than or equal to the preset accuracy rate.

This embodiment carries out the block segmentation on the to-be-detected image to segment the to-be-detected image into the plurality of image small fragments, extracts the initial tampering detection features from all the image small fragments, then encodes the extracted initial tampering detection features with the predetermined encoder to generate the complicated tampering features, and determine the tampering detection result of the to-be-detected image according to the complicated tampering features. As the tampering of the to-be-detected image is detected on the basis of the initial tampering detection features of all the image small fragments after the to-be-detected image is segmented and the complicated tampering features generated by encoding the initial tampering detection features with the encoder without depending on a JPEG compression trace theory, the image type capable of being subjected to tampering detection is not limited to JPEG; in addition, due to the segmenting and encoding modes for detection, various types of image tampering modes may be accurately detected, thus realizing accurate detection for different types and formats of image tampering.

Figure 3:
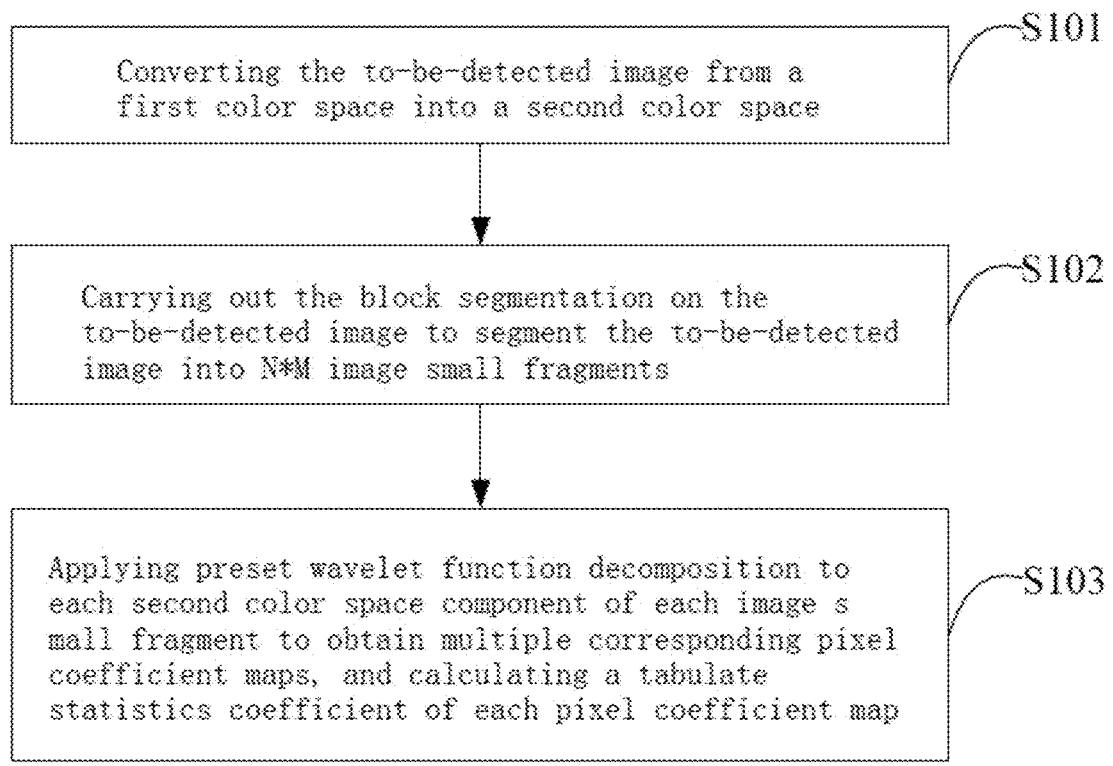
FIG. 3 is a refined flowchart of step S10 in FIG. 2.

Further, as shown in FIG. 3, the step S10 may include:

Step S101, the to-be-detected image is converted from a first color space (for example, an RGB color space) into a second color space (for example, a YCrCb color space);

Step S102, the block segmentation is carried out on the to-be-detected image to segment the to-be-detected image into N*M (for example, 32*32) image small fragments, wherein N and M are positive integers;

Step S103, a preset wavelet function, such as multi-level (for example, three-level) two-dimensional Daubechies wavelet decomposition is applied to each second color space component of each image small fragment to obtain multiple (for example, 30) corresponding pixel coefficient maps, a tabulate statistics coefficient (for example, a pixel standard deviation, a pixel mean value and/or a pixel sum which correspond to each pixel coefficient map) of each pixel coefficient map is calculated, and multiple tabulate statistics coefficients are obtained from each image small fragment by applying a wavelet function, such as Daubechies Orthogonal wavelets D2-D5, wherein the tabulate statistics coefficients are the initial tampering detection features of the corresponding image small fragments.

In this embodiment, by the way that the block segmentation is carried out on the to-be-detected image to obtain the plurality of image small fragments for feature extraction, each detail feature of the to-be-detected image may be extracted more particularly; and in addition, by the use of the ways, such as the Daubechies wavelet and the Daubechies Orthogonal wavelet, of obtaining the tabulate statistics coefficient of each image small fragment, which serves as the initial tampering detection features, the extracted initial tampering detection features may be more accurate.

Figure 4:
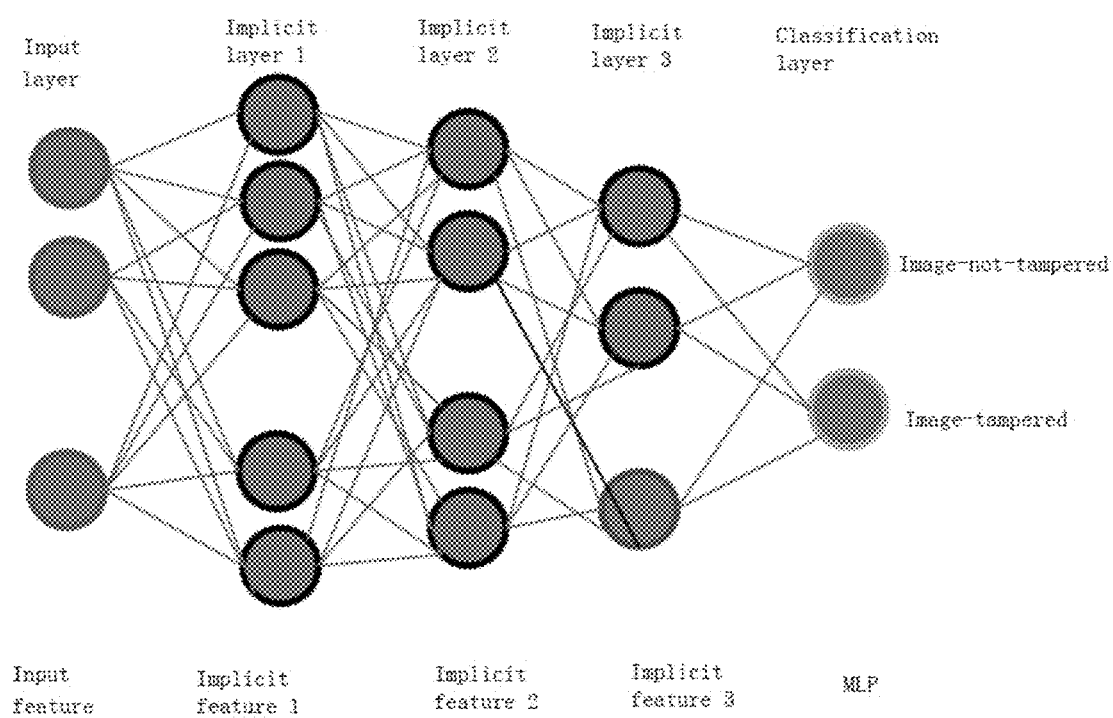
FIG. 4 is a schematic diagram of a structure of a stacked auto-encoder in one embodiment of a method of detecting image tampering of the disclosure.

Further, in other embodiments, the predetermined encoder is the Stacked Auto-Encoder (SAE). With reference to FIG. 4, FIG. 4 is a schematic diagram of a structure of a stacked auto-encoder in one embodiment of a method of detecting image tampering in accordance with the disclosure. The stacked auto-encoder is formed by stacking multiple layers of basic auto-encoders, and an output of each layer of auto-encoder is an input of the next layer of auto-encoder. The stacked auto-encoder also includes a neural network Multi-Layer Perceptron (MLP). The neural network multi-layer perceptron is jointed with the last layer of auto-encoder, and is used for determining the tampering detection result corresponding to the to-be-detected image according to the generated complicated tampering features. For example, supposing that $W^{(l)}$, $b^{(l)}$ represent a weight matrix and an offset vector of a neuron of the (l-th)th layer of auto-encoder, the input of the (l-th)th layer of auto-encoder is $Z^{(l)}$, and its output is $ae^{(l)}$, then:

$$e^{(l)}=f(Z^{(l)}), Z^{(l+1)}=W^{(l)}ae^{(l)}+b^{(l)},$$

where $f(.)$ is an activation function of the neuron. A sigmoid function is used in this embodiment, and its expression is as follows:

$$f(x) = \frac{1}{(1+\exp(-x))}.$$

A decoding process of the SAE is inverse operation of an encoding process, and relevant input and output expressions are as follows:

$$ae^{(l)}=f(Z^{(n+l)}), Z^{(n+l+1)}=W^{(n-l)}ae^{(n+l)}+b^{(n-l)},$$

where n represents the total number of encoding layers. It can be seen from the above formulas that the number of encoding layers in the SAE is consistent with that of decoding layers, but in a test, only the encoding layers are used. Therefore, when the SAE is used for extracting the features in the input, the last feature is expressed by an activation value vector Y of the last layer, and its expression is as follows:

$$Y=ae^{(n)}.$$

In this embodiment, the input layer of the stacked auto-encoder receives the initial tampering detection features, and then sends the received initial tampering detection features into a middle implicit encoding layer for feature dimension reduction filtration, and the original input layer is reconstructed through decoding of the decoding layers; encoding of the SAE and training of the decoding layers are instructed by calculating a difference between the reconstructed input and the original input, so that final outputs of the encoding layers of the SAE are senior complicated tampering features of original input features; and use of the senior complicated tampering features is favorable for improving the judgment and classification capacity of the features extracted by the SAE, thus improving the accuracy of detecting the image tampering.

Further, in other embodiments, the step S20 may include:

the initial tampering detection features of all the image small fragments are encoded with the predetermined encoder to generate the complicated tampering features of all the image small fragments;

first tampering detection results corresponding to all the image small fragments are determined according to the complicated tampering features of all the image small fragments, wherein the first tampering detection results include the image-tampered results and the image-not-tampered results;

if the first tampering detection result corresponding to one image small fragment is the image-tampered result, the tampering detection result corresponding to the to-be-detected image is determined as the image-tampered result.

In this embodiment, after the initial tampering detection features of all the image small fragments are encoded with the predetermined encoder, such as the stacked auto-encoder, to generate the corresponding complicated tampering features, the tampering of each image small fragment may be detected according to the complicated tampering feature of each image small fragment. If the first tampering detection result corresponding to one or multiple image small fragments is the image-tampered result, the to-be-detected image has a tampered part, and then the tampering detection result corresponding to the to-be-detected image is determined as the image-tampered result. If the first tampering detection results corresponding to all the image small fragments are all image-not-tampered results, the to-be-detected image has no tampered part, and then the tampering detection result corresponding to the to-be-detected image is determined as the image-not-tampered result.

Further, in other embodiments, the stacked auto-encoder also includes an adjacent region perception layer for determining the tampering detection result corresponding to the to-be-detected image according to scene information of adjacent regions. The step S20 also may include:

adjacent scene information of each image small fragment is calculated according to a preset algorithm, and a second tampering detection result corresponding to each image small fragment is determined according to the adjacent scene information of each image small fragment, wherein the second tampering detection result includes an image-tampered result and an image-not-tampered result;

if the second tampering detection result corresponding to one image small fragment is the image-tampered result, the tampering detection result corresponding to the to-be-detected image is determined as the image-tampered result;

if the second tampering detection results corresponding to all the image small fragments are all image-not-tampered results, but the first tampering detection result corresponding to one image small fragment is the image-tampered result, the tampering detection result corresponding to the to-be-detected image is determined as the image-not-tampered result.

In this embodiment, on the basis of extracting the complicated tampering features of all the image small fragments, the adjacent scene information of all the image small fragments are calculated and obtained by using the adjacent region perception layer, and the second tampering detection results corresponding to all the image small fragments are determined according to the adjacent scene information of all the image small fragments. On the basis of comprehensive consideration of the first tampering detection results and the second tampering detection results, the tampering detection of the to-be-detected image is carried out. If the second tampering detection results corresponding to all the image small fragments are all the image-not-tampered results, but the first tampering detection result corresponding to one image small fragment is the image-tampered result, the tampering detection result corresponding to the to-be-detected image is determined as the image-not-tampered result, so that the phenomenon of wrong tampering detection of the to-be-detected image due to misjudgment on the first tampering detection results and the like is prevented, and the accuracy and the stability of detecting the image tampering are further improved.

In one implementation mode, the preset algorithm includes:

for one image small fragment P, supposing that its adjacent scene information is N(p), the expression of N(p) is as follows:

$$N(P) = [Y_P^0, Y_P^1, Y_P^2, \ldots, Y_P^i, \ldots, Y_P^K],$$

$Y_P^i$ in this formula represents the complicated tampering feature of the ith adjacent image small fragment of the image small fragment P, and K represents that there are totally K image small fragments adjacent to the image small fragment P. An average value of classification results of all adjacent image small fragments corresponding to the image small fragment P is calculated, and the calculation formula of the average value is below:

$$\frac{1}{K+1} \sum Y_P^i \in N(P)^{MLP(Y_P^i)},$$

where $MLP(Y_P^i)$ represents an MLP classification result of the ith adjacent image small fragment of the image small fragment P, and K may be set as 8 (namely: 8 possible directions of each image small fragment may be used for final tampering judgment classification); if the average value of the classification results corresponding to the image small fragment P is greater than or equal to a preset threshold value (for example, 0.5), the second tampering detection result corresponding to the image small fragment P is determined as the image-tampered result, or if the average value of the classification results corresponding to the image small fragment P is less than the preset threshold value, the second tampering detection result corresponding to the image small fragment P is determined as the image-not-tampered result.

A system of detecting image tampering is further provided.

Figure 5:
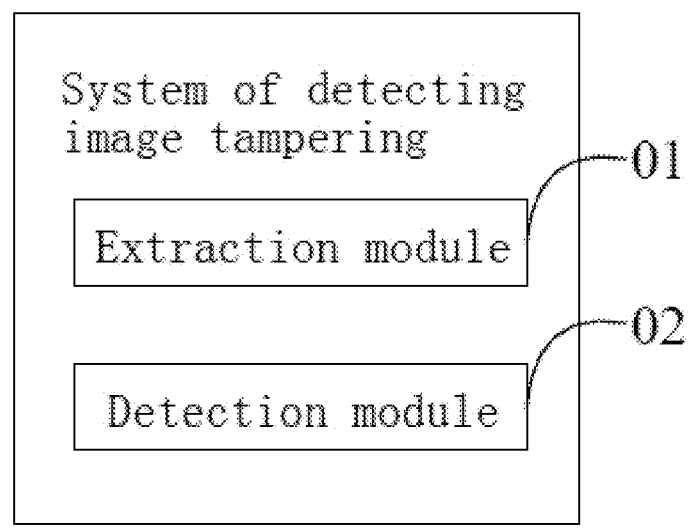
FIG. 5 is a schematic diagram of a functional module of one embodiment of a system of detecting image tampering of the disclosure.

With reference to FIG. 5, FIG. 5 is a schematic diagram of a functional module of one embodiment of a system of detecting image tamping of the disclosure.

In one embodiment, the system of detecting the image tamping includes:

an extraction module 01, which is used for carrying out block segmentation on a to-be-detected image to segment the to-be-detected image into a plurality of image small fragments, and extracting initial tampering detection features from all the image small fragments.

In this embodiment, the block segmentation is carried out on various types of to-be-detected images, such as JPEG, PNG and GIF, and the to-be-detected image is segmented into N*M (for example, 32*32) image small fragments, wherein N and M are positive integers, and the initial tampering detection features are extracted from all the image small fragments. The initial tampering detection features may include a color feature, a pixel feature and the like, and will not be limited here, wherein when the block segmentation is carried out on the to-be-detected image, the to-be-detected image may be segmented into respective image small fragments with the same sizes, or may be segmented into image small fragments with different sizes according to a certain ratio or randomly, and the segmentation will not be limited here. The image small fragments may be either in regular shapes, such as squares and rectangles, or irregularly shaped fragments, and their shapes will not be limited here.

a detection module 02, which is used for encoding the extracted initial tampering detection features with a predetermined encoder to generate complicated tampering features, and determining a tampering detection result corresponding to the to-be-detected image according to the generated complicated tampering features, wherein the tampering detection result includes an image-tampered result and a image-not-tampered result.

After the initial tampering detection features in all the image small fragments are extracted, the extracted initial tampering detection features are encoded with the predetermined encoder to generate the complicated tampering features, and detection is finally carried out according to the generated complicated tampering features to determine whether the to-be-detected image is in a tampered state or a non-tampered state, wherein the predetermined encoder may be a relatively fixed encoder, and also may be an encoder capable of performing deep learning such as learning and training, for example a single auto-encoder and a stacked auto-encoder, and it will not be limited here.

In one implementation mode, the predetermined encoder is capable of performing deep learning such as learning and training, for example the stacked auto-encoder. A training process of the predetermined encoder is as follows:

C. a preset number (for example, 100,000) of image samples are obtained, and the tampering result of each image sample is marked, wherein the tampering result includes the image-tampered result and the image-not-tampered result;

D. block segmentation is carried out on each image sample to segment each image sample into N*M (for example, 32*32) image small fragments, wherein N and M are positive integers, and initial tampering detection features are extracted from all the image small fragments of each image sample to extract the initial tampering detection features corresponding to each image sample;

E. all the image samples are classified into a first data set and a second data set according to a ratio of X to Y (for example, 8 to 2), wherein the number of image samples in the first data set is greater than that of image samples in the second data set, the first data set is used as a training set, and the second data set is used as a test set; and X is greater than 0, and Y is greater than 0;

F. the encoder is trained with the initial tampering detection features corresponding to all the image samples in the first data set, and the accuracy rate of the trained encoder is verified with the initial tampering detection features corresponding to all the image samples in the second data set;

G. if the accuracy rate of the trained encoder is greater than or equal to a preset accuracy rate (for example, 95%), the training is ended, or if the accuracy rate of the trained encoder is less than the preset accuracy rate, the number of image samples is increased, and the steps D, E and F are repeatedly executed till the accuracy rate of the trained encoder is greater than or equal to the preset accuracy rate.

This embodiment carries out the block segmentation on the to-be-detected image to segment the to-be-detected image into the plurality of image small fragments, extracts the initial tampering detection features from all the image small fragments, then encodes the extracted initial tampering detection features with the predetermined encoder to generate the complicated tampering features, and determine the tampering detection result of the to-be-detected image according to the complicated tampering features. As the tampering of the to-be-detected image is detected on the basis of the initial tampering detection features of all the image small fragments after the to-be-detected image is segmented and the complicated tampering features generated by encoding the initial tampering detection features with the encoder without depending on a JPEG compression trace theory, the image type capable of being subjected to tampering detection is not limited to JPEG; in addition, due to the segmenting and encoding modes for detection, various types of image tampering modes may be accurately detected, thus realizing accurate detection for different types and formats of image tampering.

Figure 6:
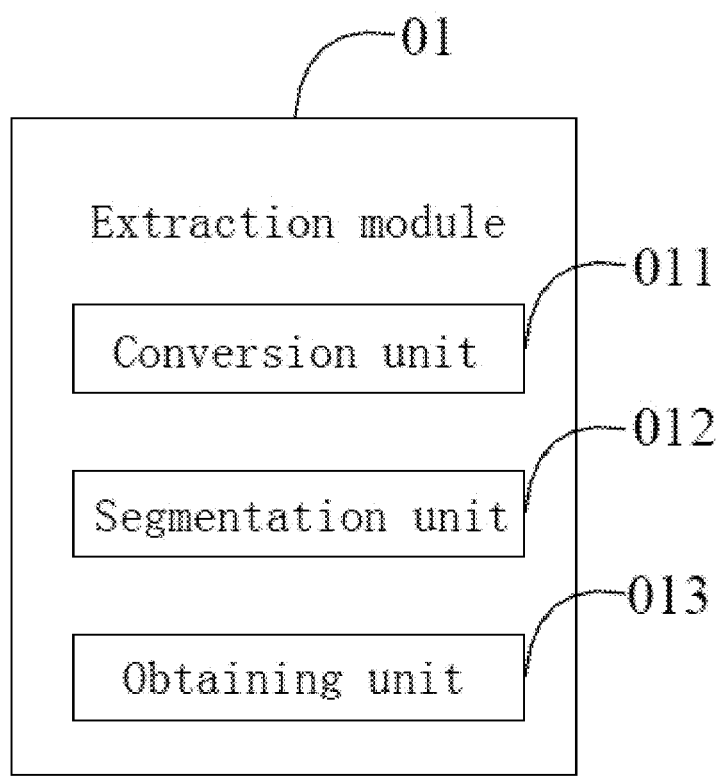
FIG. 6 is a schematic diagram of a refined functional module of an extraction module 01 in FIG. 5.

Further, as shown in FIG. 6, the extraction module 01 may include:

a conversion unit 011, which is used for converting the to-be-detected image from a first color space (for example, an RGB color space) into a second color space (for example, a YCrCb color space);

a segmentation unit 012, which is used for carrying out the block segmentation on the to-be-detected image to segment the to-be-detected image into N*M (for example, 32*32) image small fragments, wherein N and M are positive integers;

an obtaining unit 013, which is used for applying a preset wavelet function, such as multi-level (for example, three-level) two-dimensional Daubechies wavelet decomposition to each second color space component of each image small fragment to obtain multiple (for example, 30) corresponding pixel coefficient maps, calculating a tabulate statistics coefficient (for example, a pixel standard deviation, a pixel mean value and/or a pixel sum which correspond to each pixel coefficient map) of each pixel coefficient map, and obtaining multiple tabulate statistics coefficients from each image small fragment by applying a wavelet function, such as Daubechies Orthogonal wavelets D2-D5, wherein the tabulate statistics coefficients are the initial tampering detection features of the corresponding image small fragments.

In this embodiment, by the way of carrying out the block segmentation on the to-be-detected image to obtain the plurality of image small fragments for feature extraction, each detail feature of the to-be-detected image may be extracted more particularly; and in addition, by the use of the ways, such as the Daubechies wavelet and the Daubechies Orthogonal wavelet, of obtaining the tabulate statistics coefficient of each image small fragment, which serves as the initial tampering detection features, the extracted initial tampering detection features may be more accurate.

Further, in other embodiments, the predetermined encoder is the Stacked Auto-Encoder (SAE). With reference to FIG. 4, the stacked auto-encoder is formed by stacking multiple layers of basic auto-encoders, and an output of each layer of auto-encoder is an input of the next layer of auto-encoder. The stacked auto-encoder also includes a neural network Multi-Layer Perceptron (MLP). The neural network multi-layer perceptron is jointed with the last layer of auto-encoder, and is used for determining the tampering detection result of the to-be-detected image according to the generated complicated tampering features. For example, supposing that $W^{(l)}$, $b^{(l)}$ represent a weight matrix and an offset vector of a neuron of the (l-th)th layer of auto-encoder, the input of the (l-th)th layer of auto-encoder is $Z^{(l)}$, and its output is $ae^{(l)}$, then:

$$e^{(l)} = f(Z^{(l)}), Z^{(l+1)} = W^{(l)} ae^{(l)} + b^{(l)},$$

where $f(.)$ is an activation function of the neuron. A sigmoid function is used in this embodiment, and its expression is as follows:

$$f(x) = \frac{1}{(1+\exp(-x))}.$$

A decoding process of the SAE is inverse operation of an encoding process, and relevant input and output expressions are as follows:

$$ae^{(l)} = f(Z^{(n+l)}), Z^{(n+l+1)} = W^{(n-l)} ae^{(n+l)} + b^{(n-l)},$$

where n represents the total number of encoding layers. It can be seen from the above formulas that the number of encoding layers in the SAE is consistent with that of decoding layers, but in a test, only the encoding layers are used. Therefore, when the SAE is used for extracting the features in the input, the last feature is expressed by an activation value vector Y of the last layer, and its expression is as follows:

$$Y=ae^{(n)}.$$

In this embodiment, the input layer of the stacked auto-encoder receives the initial tampering detection features, and then sends the received initial tampering detection features into a middle implicit encoding layer for feature dimension reduction filtration, and the original input layer is reconstructed through decoding of the decoding layers; encoding of the SAE and training of the decoding layers are instructed by calculating a difference between the reconstructed input and the original input, so that final outputs of the encoding layers of the SAE are senior complicated tampering features of original input features; and use of the senior complicated tampering features is favorable for improving the judgment and classification capacity of the features extracted by the SAE, thus improving the accuracy of detecting the image tampering.

Further, in other embodiments, the detection module 02 also may be used for:

encoding the initial tampering detection features of all the image small fragments with the predetermined encoder to generate the complicated tampering features of all the image small fragments;

determining first tampering detection results corresponding to all the image small fragments according to the complicated tampering features of all the image small fragments, wherein the first tampering detection results include the image-tampered results and the image-not-tampered results;

if the first tampering detection result corresponding to one image small fragment is the image-tampered result, determining that the tampering detection result corresponding to the to-be-detected image is the image-tampered result.

In this embodiment, after the initial tampering detection features of all the image small fragments are encoded with the predetermined encoder, such as the stacked auto-encoder, to generate the corresponding complicated tampering features, the tampering of each image small fragment may be detected according to the complicated tampering feature of each image small fragment. If the first tampering detection result corresponding to one or multiple image small fragments is the image-tampered result, the to-be-detected image has a tampered part, and then the tampering detection result corresponding to the to-be-detected image is determined as the image-tampered result. If the first tampering detection results corresponding to all the image small fragments are all image-not-tampered results, the to-be-detected image has no tampered part, and then the tampering detection result corresponding to the to-be-detected image is determined as the image-not-tampered result.

Further, in other embodiments, the stacked auto-encoder also includes an adjacent region perception layer for determining the tampering detection result corresponding to the to-be-detected image according to scene information of adjacent regions. The detection module 02 also may be used for:

calculating adjacent scene information of each image small fragment according to a preset algorithm, and determining a second tampering detection result corresponding to each image small fragment according to the adjacent scene information of each image small fragment, wherein the second tampering detection result includes an image-tampered result and an image-not-tampered result;

if the second tampering detection result corresponding to one image small fragment is the image-tampered result, determining that the tampering detection result corresponding to the to-be-detected image is the image-tampered result;

if the second tampering detection results corresponding to all the image small fragments are all image-not-tampered results, but the first tampering detection result corresponding to one image small fragment is the image-tampered result, determining that the tampering detection result corresponding to the to-be-detected image is the image-not-tampered result.

In this embodiment, on the basis of extracting the complicated tampering features of all the image small fragments, the adjacent scene information of all the image small fragments are calculated and obtained by using the adjacent region perception layer, and the second tampering detection results corresponding to all the image small fragments are determined according to the adjacent scene information of all the image small fragments. On the basis of comprehensive consideration of the first tampering detection results and the second tampering detection results, the tampering detection of the to-be-detected image is carried out. If the second tampering detection results corresponding to all the image small fragments are all the image-not-tampered results, but the first tampering detection result corresponding to one image small fragment is the image-tampered result, the tampering detection result corresponding to the to-be-detected image is determined as the image-not-tampered result, so that the phenomenon of wrong tampering detection of the to-be-detected image due to misjudgment on the first tampering detection results and the like is prevented, and the accuracy and the stability of detecting the image tampering are further improved.

In one implementation mode, the preset algorithm includes:

for one image small fragment P, supposing that its adjacent scene information is N(p), the expression of N(p) is as follows:

$$N(P)=[Y_P^0, Y_P^1, Y_P^2, \ldots, Y_P^i, \ldots, Y_P^K],$$

$Y_P^i$ in this formula represents the complicated tampering feature of the ith adjacent image small fragment of the image small fragment P, and K represents that there are totally K image small fragments adjacent to the image small fragment P. An average value of classification results of all adjacent image small fragments corresponding to the image small fragment P is calculated, and the calculation formula of the average value is below:

$$\frac{1}{K+1}\sum Y_P^i \in N(P)^{MLP(Y_P^i)},$$

where $MLP(Y_P^i)$ represents an MLP classification result of the ith adjacent image small fragment of the image small fragment P, and K may be set as 8 (namely: 8 possible directions of each image small fragment may be used for final tampering judgment classification); if the average value of the classification results corresponding to the image small fragment P is greater than or equal to a preset threshold value (for example, 0.5), the second tampering detection result corresponding to the image small fragment P is the image-tampered result, or if the average value of the classification results corresponding to the image small fragment P is less than the preset threshold value, the second tampering detection result corresponding to the image small fragment P is the image-not-tampered result.

In the aspect of hardware implementation, the extraction module 01, the detection module 02 and the like may be embedded or independent in an electronic device by means of hardware, and also may be stored in storage equipment of the electronic device by means of software so as to call processing equipment to execute operations corresponding to the various modules. The processing equipment may be a Central Processing Unit (CPU), a micro processor, a single-chip microcomputer and the like.

In addition, a computer readable storage medium is further provided. The computer readable storage medium stores a system of detecting image tampering. The system of detecting the image tampering may be executed by at least one processor, so that the at least one processor may execute the steps of the method of detecting image tampering in the above embodiments. Specific implementation processes of the steps S10, S20 and S30 of the method of detecting image tampering are as mentioned above, so that no more details will be given here.

It should be noted that in this text, terms "include" and "comprise" or any other variations aiming at covering non-excludable including, so that processes, methods, objects or devices including a series of elements not only include those elements, but also include other elements which are not definitely listed, or also include fixed elements of these processes, methods, objects or devices. In the absence of more restrictions, an element defined by a sentence "including a . . . " does not exclude that the processes, methods, objects or devices including this element still include other same elements.

By the description of the foregoing implementation modes, it will be evident to those skilled in the art that the methods according to the above embodiments may be implemented by means of software plus a necessary general-purpose hardware platform; they may of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., an ROM/RAM, a magnetic disk, an optical disc) and may include a plurality of instructions that, when executed, can cause a set of terminal equipment (e.g., a mobile phone, a computer, a server, a conditioner, network equipment), to execute the methods described in the various embodiments of the disclosure.

The foregoing accompanying drawings describe exemplary embodiments and therefore are not intended as limiting the patentable scope of the disclosure. The foregoing numbering of the embodiments of the disclosure is merely descriptive, but is not indicative of the pros and cons of these embodiments. In addition, although a logic sequence is shown in the flowchart, the steps shown or described may be executed in a sequence different from this logic sequence in some cases.

Those skilled in the art can make various transformation solutions to implement the disclosure without departing from the scope and essence of the disclosure, for example, features of one embodiment may be used in another embodiment to obtain another embodiment. Any modifications, equivalent replacements and improvements that are made taking advantage of the technical conception of the disclosure shall all fall in the scope of protection of the disclosure.

What is claimed is:

1. A method of detecting image tampering, comprising:
step A, carrying out block segmentation on a to-be-detected image to segment the to-be-detected image into a plurality of image small fragments, and extracting initial tampering detection features from all the image small fragments;
step B, encoding the extracted initial tampering detection features with a predetermined encoder to generate tampering features, and determining a tampering detection result corresponding to the to-be-detected image according to the generated tampering features, wherein the tampering detection result comprises an image-tampered result and an image-not-tampered result;
wherein the predetermined encoder is a stacked auto-encoder, the stacked auto-encoder is formed by stacking multiple layers of basic auto-encoders, and an output of each layer of the stacked auto-encoder is an input of a next layer of the stacked auto-encoder; the stacked auto-encoder further comprises a neural network multi-layer perceptron; the neural network multi-layer perceptron is jointed with a last layer of the stacked auto-encoder, and is configured to determine the tampering detection result corresponding to the to-be-detected image according to the generated tampering feature;
wherein the step B comprises:
encoding the initial tampering detection features of all the image small fragments with the predetermined encoder to generate the tampering features of all the image small fragments;
determining first tampering detection results corresponding to all the image small fragments according to the tampering features of all the image small fragments, wherein the first tampering detection result comprise the image-tampered result and the image-not-tampered result;
if having a first tampering detection result corresponding to one image small fragment is the image-tampered result, determining that the tampering detection result corresponding to the to-be-detected image is the image-tampered result;
wherein the stacked auto-encoder further comprises an adjacent region perception layer for determining the tampering detection result corresponding to the to-be-detected image according to a scene information of adjacent regions;
wherein the step B further comprises:
calculating an adjacent scene information of the each image small fragment according to a preset algorithm, and determining a second tampering detection result corresponding to the each image small fragment according to the adjacent scene information of the each image small fragment, wherein the second tampering detection result comprises the image-tampered result and the image-not-tampered result;
if having a second tampering detection result corresponding to one image small fragment is the image-tampered result, determining that the tampering detection result corresponding to the to-be-detected image is the image-tampered result;
if the second tampering detection results corresponding to all the image small fragments are all image-not-tampered results, but having a first tampering detection result corresponding to one image small fragment is the image-tampered result, determining that the tampering detection result corresponding to the to-be-detected image is the image-not-tampered result.

2. The method of detecting image tampering of claim 1, wherein the step A comprises:

converting the to-be-detected image from a first color space into a second color space;

carrying out the block segmentation on the to-be-detected image to segment the to-be-detected image into N*M image small fragments, wherein N and M are positive integers;

applying a preset wavelet function decomposition to each second color space component of each image small fragment to obtain multiple corresponding pixel coefficient maps, calculating a tabulate statistics coefficient of each pixel coefficient map, and obtaining multiple tabulate statistics coefficients from the each image small fragment, wherein the tabulate statistics coefficients are regarded as the initial tampering detection features of the corresponding image small fragments.

3. The method of detecting image tampering of claim 1, wherein a training process of the predetermined encoder comprises:

step C, obtaining a preset number of image samples, and marking the tampering result of each image sample, wherein the tampering result comprises the image-tampered result and the image-not-tampered result;

step D, carrying out block segmentation on each image sample to segment the each image sample into N*M image small fragments, wherein N and M are positive integers, and extracting initial tampering detection features from all the image small fragments of the each image sample to extract the initial tampering detection features corresponding to the each image sample;

step E, classifying all the image samples into a first data set and a second data set according to a ratio of X to Y, wherein the number of image samples in the first data set is greater than that of image samples in the second data set, the first data set is used as a training set, and the second data set is used as a test set; and X is greater than 0, and Y is greater than 0;

step F, training the encoder with the initial tampering detection features corresponding to all the image samples in the first data set, and verifying the accuracy rate of the trained encoder with the initial tampering detection features corresponding to all the image samples in the second data set;

step G, if the accuracy rate of the trained encoder is greater than or equal to a preset accuracy rate, ending the training, or if the accuracy rate of the trained encoder is less than the preset accuracy rate, increasing the number of image samples, and repeatedly executing the steps D, E and F till the accuracy rate of the trained encoder is greater than or equal to the preset accuracy rate.

4. A system of detecting image tampering, comprising:

an extraction module configured for carrying out block segmentation on a to-be-detected image to segment the to-be-detected image into a plurality of image small fragments, and extracting initial tampering detection features from all the image small fragments;

a detection module configured for encoding the extracted initial tampering detection features with a predetermined encoder to generate tampering features, and determining a tampering detection result corresponding to the to-be-detected image according to the generated tampering features, wherein the tampering detection result comprises an image-tampered result and an image-not-tampered result;

wherein the predetermined encoder is a stacked auto-encoder; the stacked auto-encoder is formed by stacking multiple layers of basic auto-encoders, and an output of each layer of the stacked auto-encoder is an input of a next layer of the stacked auto-encoders; the stacked auto-encoder further comprises a neural network multi-layer perceptron; the neural network multi-layer perceptron is jointed with a last layer of the stacked auto-encoder, and is configured to determine the tampering detection result corresponding to the to-be-detected image according to the generated tampering features;

wherein the detection module is further configured for:

encoding the initial tampering detection features of all the image small fragments with the predetermined encoder to generate the tampering features of all the image small fragments;

determining first tampering detection results corresponding to all the image small fragments according to the tampering features of all the image small fragments, wherein the first tampering detection results comprise the image-tampered results and the image-not-tampered result;

if having a first tampering detection result corresponding to one image small fragment is the image-tampered result, determining that the tampering detection result corresponding to the to-be-detected image is the image-tampered result;

wherein the stacked auto-encoder further comprises an adjacent region perception layer for determining the tampering detection result corresponding to the to-be-detected image according to a scene information of adjacent regions;

the detection module is further configured for:

calculating an adjacent scene information of each image small fragment according to a preset algorithm, and determining a second tampering detection result corresponding to the each image small fragment according to the adjacent scene information of the each image small fragment, wherein the second tampering detection result comprises the image-tampered result and the image-not-tampered result;

if having a second tampering detection result corresponding to one image small fragment is the image-tampered result, determining that the tampering detection result corresponding to the to-be-detected image is the image-tampered result;

if the second tampering detection results corresponding to all the image small fragments are all image-not-tampered results, but having a first tampering detection result corresponding to one image small fragment is the image-tampered result, determining that the tampering detection result corresponding to the to-be-detected image is the image-not-tampered result.

5. The system of detecting image tampering of claim 4, wherein the extraction module comprises:

a conversion unit configured for converting the to-be-detected image from a first color space into a second color space;

a segmentation unit configured for carrying out the block segmentation on the to-be-detected image to segment the to-be-detected image into N*M image small fragments, wherein N and M are positive integers;

an obtaining unit configured for applying preset wavelet function decomposition to each second color space component of each image small fragment to obtain multiple corresponding pixel coefficient maps, calculating a tabulate statistics coefficient of each pixel coefficient map, and obtaining multiple tabulate statistics coefficients from the each image small fragment, wherein the tabulate statistics coefficients are regarded as the initial tampering detection features of the corresponding image small fragments.

6. The system of detecting image tampering of claim 4, wherein a training process of the predetermined encoder comprises:
step C, obtaining a preset number of image samples, and marking the tampering result of each image sample, wherein the tampering result comprises the image-tampered result and the image-not-tampered result;
step D, carrying out block segmentation on each image sample to segment each image sample into N*M image small fragments, wherein N and M are positive integers, and extracting initial tampering detection features from all the image small fragments of each image sample to extract the initial tampering detection features corresponding to each image sample;
step E, classifying all the image samples into a first data set and a second data set according to a ratio of X to Y, wherein the number of image samples in the first data set is greater than that of image samples in the second data set, the first data set is used as a training set, and the second data set is used as a test set; and X is greater than 0, and Y is greater than 0;
step F, training the encoder with the initial tampering detection features corresponding to all the image samples in the first data set, and verifying the accuracy rate of the trained encoder with the initial tampering detection features corresponding to all the image samples in the second data set;
step G, if the accuracy rate of the trained encoder is greater than or equal to a preset accuracy rate, ending the training, or if the accuracy rate of the trained encoder is less than the preset accuracy rate, increasing the number of image samples, and repeatedly executing the steps D, E and F till the accuracy rate of the trained encoder is greater than or equal to the preset accuracy rate.

7. An electronic device, comprising a processing equipment and a storage equipment, wherein the storage equipment stores an image tampering detection system comprising at least one computer readable instruction; and the at least one computer readable instruction is executed by the processing equipment to implement the following operations:
step A, carrying out block segmentation on a to-be-detected image to segment the to-be-detected image into a plurality of image small fragments, and extracting initial tampering detection features from all the image small fragments;
step B, encoding the extracted initial tampering detection features with a predetermined encoder to generate tampering features, and determining a tampering detection result corresponding to the to-be-detected image according to the generated tampering features, wherein the tampering detection result comprises an image-tampered result and an image-not-tampered result;
wherein the predetermined encoder is a stacked auto-encoder; the stacked auto-encoder is formed by stacking multiple layers of basic auto-encoders, and an output of each layer of the stacked auto-encoder is an input of a next layer of the stacked auto-encoder; the stacked auto-encoder further comprises a neural network multi-layer perceptron; the neural network multi-layer perceptron is jointed with a last layer of the stacked auto-encoder, and is configured to determine the tampering detection result corresponding to the to-be-detected image according to the generated tampering features;
wherein the step B comprises:
encoding the initial tampering detection features of all the image small fragments with the predetermined encoder to generate the tampering features of all the image small fragments;
determining first tampering detection results corresponding to all the image small fragments according to the tampering features of all the image small fragments, wherein the first tampering detection results comprise the image-tampered results and the image-not-tampered results;
if having a first tampering detection result corresponding to one image small fragment is the image-tampered result, determining that the tampering detection result corresponding to the to-be-detected image is the image-tampered result;
wherein the stacked auto-encoder further comprises an adjacent region perception layer for determining the tampering detection result corresponding to the to-be-detected image according to scene information of adjacent regions;
wherein the step B further comprises:
calculating an adjacent scene information of each image small fragment according to a preset algorithm, and determining a second tampering detection result corresponding to the each image small fragment according to the adjacent scene information of the each image small fragment, wherein the second tampering detection result comprises the image-tampered result and the image-not-tampered result;
if the second tampering detection result corresponding to one image small fragment is the image-tampered result, determining that the tampering detection result corresponding to the to-be-detected image is the image-tampered result;
if the second tampering detection results corresponding to all the image small fragments are all image-not-tampered results, but having a first tampering detection result corresponding to one image small fragment is the image-tampered result, determining that the tampering detection result corresponding to the to-be-detected image is the image-not-tampered result.

8. The electronic device of claim 7, wherein the at least one computer readable instruction is executed by the processing equipment, wherein the step A comprises:
converting the to-be-detected image from a first color space into a second color space;
carrying out the block segmentation on the to-be-detected image to segment the to-be-detected image into N*M image small fragments, wherein N and M are positive integers;
applying a preset wavelet function decomposition to each second color space component on the each image small fragment to obtain multiple corresponding pixel coefficient maps, calculating a tabulate statistics coefficient of each pixel coefficient map, and obtaining multiple tabulate statistics coefficients from each image small fragment, wherein the tabulate statistics coefficients are regarded as the initial tampering detection features of the corresponding image small fragments.

* * * * *